US010511553B2

(12) United States Patent
Duquene et al.

(10) Patent No.: US 10,511,553 B2
(45) Date of Patent: Dec. 17, 2019

(54) PASS THROUGH SHARING OF RESOURCES

(71) Applicant: International Business Machines Corporation, Armonk, NY (US)

(72) Inventors: Joel Duquene, Raleigh, NC (US); Morris S. Johnson, Jr., Cary, NC (US); Henri F. Meli, Cary, NC (US); Adrienne Y. Miller, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 696 days.

(21) Appl. No.: 14/143,476

(22) Filed: Dec. 30, 2013

(65) Prior Publication Data

US 2015/0189032 A1    Jul. 2, 2015

(51) Int. Cl.
*H04L 12/58*    (2006.01)
*H04L 29/06*    (2006.01)

(52) U.S. Cl.
CPC ............ *H04L 51/046* (2013.01); *H04L 51/08* (2013.01); *H04L 63/104* (2013.01)

(58) Field of Classification Search
CPC .................................................. H04L 51/046
USPC ........................................................ 709/204
See application file for complete search history.

(56) References Cited

U.S. PATENT DOCUMENTS

| 6,356,941 | B1 * | 3/2002 | Cohen | G06F 21/6272 |
| | | | | 709/219 |
| 7,353,252 | B1 | 4/2008 | Yang et al. | |
| 8,484,292 | B2 | 7/2013 | Spataro et al. | |
| 9,021,113 | B2 * | 4/2015 | Carr | G06Q 50/01 |
| | | | | 709/227 |
| 9,769,216 | B2 * | 9/2017 | Gaetano, Jr. | H04L 65/1069 |
| 9,874,989 | B1 * | 1/2018 | Lewis | G06F 3/048 |
| 2004/0252185 | A1 * | 12/2004 | Vernon | G06Q 10/10 |
| | | | | 348/14.08 |
| 2005/0198204 | A1 * | 9/2005 | Takahashi | G06F 21/6218 |
| | | | | 709/219 |
| 2005/0227218 | A1 * | 10/2005 | Mehta | G09B 5/00 |
| | | | | 434/350 |
| 2005/0246193 | A1 * | 11/2005 | Roever | G06Q 40/00 |
| | | | | 705/35 |

(Continued)

FOREIGN PATENT DOCUMENTS

WO    2011098749 A2    8/2011

OTHER PUBLICATIONS

Feinberg et al., "Cattail Social File Sharing," http://researcher.watson.ibm.com/researcher/view_project.php?id+2245 [Aug. 13, 2013 1:00:39 PM] downloaded Nov. 25, 2013, pp. 1.

*Primary Examiner* — Kevin T Bates
*Assistant Examiner* — Ronak Patel
(74) *Attorney, Agent, or Firm* — Brian J. Colandreo, Esq.; Jeffrey T. Placker, Esq.; Holland & Knigth LLP

(57) ABSTRACT

A computer-implemented method, computer program product, and computing system is provided for sharing resources between users. In an implementation, a method may include receiving a sharing request for a resource from a requesting participant of a collaborative session. The method may also include receiving a sharing authorization from a sharing participant of the collaborative session. The method may further include simultaneously downloading the resource from a resource location by a computing device associated with the sharing participant and uploading the resource to the requesting participant by the computing device associated with the sharing participant.

14 Claims, 8 Drawing Sheets

(56) References Cited

U.S. PATENT DOCUMENTS

| | | | |
|---|---|---|---|
| 2007/0038701 A1* | 2/2007 | Majors | H04L 12/1813 709/204 |
| 2007/0156689 A1* | 7/2007 | Meek | G06F 9/541 |
| 2007/0297610 A1* | 12/2007 | Chen | H04L 9/0822 380/270 |
| 2008/0133538 A1* | 6/2008 | Chavez | H04L 67/104 |
| 2009/0249224 A1* | 10/2009 | Davis | G06Q 10/10 715/753 |
| 2009/0307361 A1* | 12/2009 | Issa | H04L 63/105 709/229 |
| 2010/0088364 A1* | 4/2010 | Carter | G06F 21/6272 709/203 |
| 2010/0146115 A1* | 6/2010 | Bezos | H04L 67/06 709/225 |
| 2010/0228824 A1* | 9/2010 | Lin | H04L 12/1818 709/204 |
| 2011/0055329 A1* | 3/2011 | Abt, Jr. | G06F 17/3089 709/205 |
| 2012/0226663 A1* | 9/2012 | Valdez Kline | G06F 17/30091 707/640 |
| 2012/0233228 A1* | 9/2012 | Barton | H04L 67/06 707/827 |
| 2013/0080545 A1 | 3/2013 | Datta | |
| 2013/0145284 A1* | 6/2013 | Anantharaman | H04L 12/1822 715/753 |
| 2013/0262686 A1* | 10/2013 | Hill | H04L 65/1069 709/228 |
| 2013/0332723 A1* | 12/2013 | Tan | G06F 21/606 713/150 |
| 2014/0095655 A1* | 4/2014 | Chatterjee | H04L 67/2809 709/217 |
| 2014/0310374 A1* | 10/2014 | Lee | H04L 45/02 709/213 |
| 2015/0095451 A1* | 4/2015 | Homsany | H04L 67/06 709/217 |

* cited by examiner

PASS THROUGH SHARING OF RESOURCES

TECHNICAL FIELD

The present disclosure generally relates to systems and method for collaborative communications, and more particularly relates to sharing resources during communication sessions.

BACKGROUND

The Internet currently allows for the free exchange of ideas and information in a manner that was unimaginable only a couple of decades ago. One such use for the Internet is as a communication medium, whether it is via one-on-one exchanges or multi-party exchanges. For example, two individuals may exchange private emails with each other, and engage in instant messaging chat sessions. Similarly, many social networking applications and websites may allow individuals to communicate with one another, for example, through synchronous posting of entries that are published for multiple people to read. Social networking applications and websites may also allow more synchronous, or real-time, communications between users, for example, in the form of instant messaging-like chats, video conferencing, voice conferencing, and the like. The Internet may further be used to distribute content to users. For example, video content, text and/or graphical material, and the like, may be simultaneously multicast to a plurality of user in the form of an online meeting, or other collaborative forum.

SUMMARY OF DISCLOSURE

According to an implementation, a computer-implemented method may include receiving a sharing request for a resource from a requesting participant of a collaborative session. The method may also include receiving a sharing authorization from a sharing participant of the collaborative session. The method may further include simultaneously downloading the resource from a resource location by a computing device associated with the sharing participant and uploading the resource to the requesting participant by the computing device associated with the sharing participant.

One or more of the following features may be included. Receiving the sharing request may be based upon, at least in part the requesting participant selecting a link to the resource that is not accessible by the requesting participant.

An indicator of available sharing participants for the resource may be provided to the requesting participant. Receiving the sharing request may include receiving a selection of one or more of the available sharing participants. A request for the resource from the requesting participant may be provided to available sharing participants of the collaborative session. Receiving the sharing authorization may include receiving the sharing authorization from one or more of the available sharing participants. A download metric may be provided associated with each available sharing participant. A selection of an available sharing participant may be received from the requesting participant.

Simultaneously downloading the resource by the computing device associated with the sharing participant and uploading the resource to the requesting participant may include making the resource available for download from the computing device associated with the sharing participant by the requesting participant before the entire resource has been downloaded by the computing device associated with the sharing participant. A notification may be provided to the requesting participant when the resource is available from the computing device associated with the sharing participant.

According to another implementation, a computer program product includes a computer readable storage medium having a plurality of instructions stored on it. When executed by a processor, the instructions may cause the processor to perform operations including receiving a sharing request for a resource from a requesting participant of a collaborative session. A sharing authorization may be received from a sharing participant of the collaborative session. Instructions may also be included for simultaneously downloading the resource from a resource location by a computing device associated with the sharing participant and uploading the resource to the requesting participant by the computing device associated with the sharing participant.

One or more of the following features may be included. Receiving the sharing request may be based upon, at least in part the requesting participant selecting a link to the resource that is not accessible by the requesting participant. Instructions may be included for providing an indicator of available sharing participants for the resource to the requesting participant. Receiving the sharing request may include receiving a selection of one or more of the available sharing participants.

A request for the resource may be provided from the requesting participant to available sharing participants of the collaborative session. Receiving the sharing authorization may include receiving the sharing authorization from one or more of the available sharing participants. A download metric may be provided associated with each available sharing participant. A selection of an available sharing participant may be received from the requesting participant.

Simultaneously downloading the resource by the computing device associated with the sharing participant and uploading the resource to the requesting participant may include making the resource available for download from the computing device associated with the sharing participant by the requesting participant before the entire resource has been downloaded by the computing device associated with the sharing participant. A notification may be provided to the requesting participant when the resource is available from the computing device associated with the sharing participant.

According to another implementation, a computing system may include a processor and a memory architecture coupled with the processor. The processor may be configured for receiving a sharing request for a resource from a requesting participant of a collaborative session. The processor may also be configured for receiving a sharing authorization from a sharing participant of the collaborative session. Instructions may also be included for simultaneously downloading the resource from a resource location by a computing device associated with the sharing participant and uploading the resource to the requesting participant by the computing device associated with the sharing participant.

One or more of the following features may be included. Receiving the sharing request may be based upon, at least in part the requesting participant selecting a link to the resource that is not accessible by the requesting participant. An indicator of available sharing participants for the resource may be provided to the requesting participant. Receiving the sharing request may include receiving a selection of one or more of the available sharing participants.

A request for the resource may be provided from the requesting participant to available sharing participants of the collaborative session. Receiving the sharing authorization may include receiving the sharing authorization from one or more of the available sharing participants. A download metric may be provided associated with each available sharing participant. A selection of an available sharing participant may be received from the requesting participant. Simultaneously downloading the resource by the computing device associated with the sharing participant and uploading the resource to the requesting participant may include making the resource available for download from the computing device associated with the sharing participant by the requesting participant before the entire resource has been downloaded by the computing device associated with the sharing participant.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

People may often desire access to resources, such as documents, files, presentations, etc., which may be located on a system, network, or other location that the person is not able to access. For example, the individual wishing to access the resources may not be connected to the system or network on which the resources are located, or may not have the appropriate access authorization, either due to the individual's location, or due to access restrictions, or for some other reason. In an embodiment, the present disclosure may enable individuals to access resources through a collaborative session with another individual who has access to the resources. The collaborative session could include, but is not limited to, a communication interaction, such as an instant messaging exchange, an electronic meeting, a network enabled audio or video conference, an exchange on a shared collaborative workspace, or the like. In an embodiment, the individual who has access to the resources may act as a pass-through. In one such embodiment, the individual having access to the resource may download the document, file, or the like. The individual desiring access to the resources may download a desired document, file, or the like from the person who has access to the resource by way of the collaborative session. For example, the request for the resources, and the transfer of the resources between the two individual may occur within the environment of the collaborative session. In some embodiments, the pass-through individual may not be required to completely download the resource before uploading the resource to the individual who desires the resource. For example, once the pass-through individual begins downloading the resource, the resource may begin to be uploaded to the individual desiring the resource. In some embodiments, a copy of the resources may not be retained on a computing device utilized by the pass-through individual. Various additional and/or alternative embodiments may be implemented consistent with the present disclosure.

Figure 1:
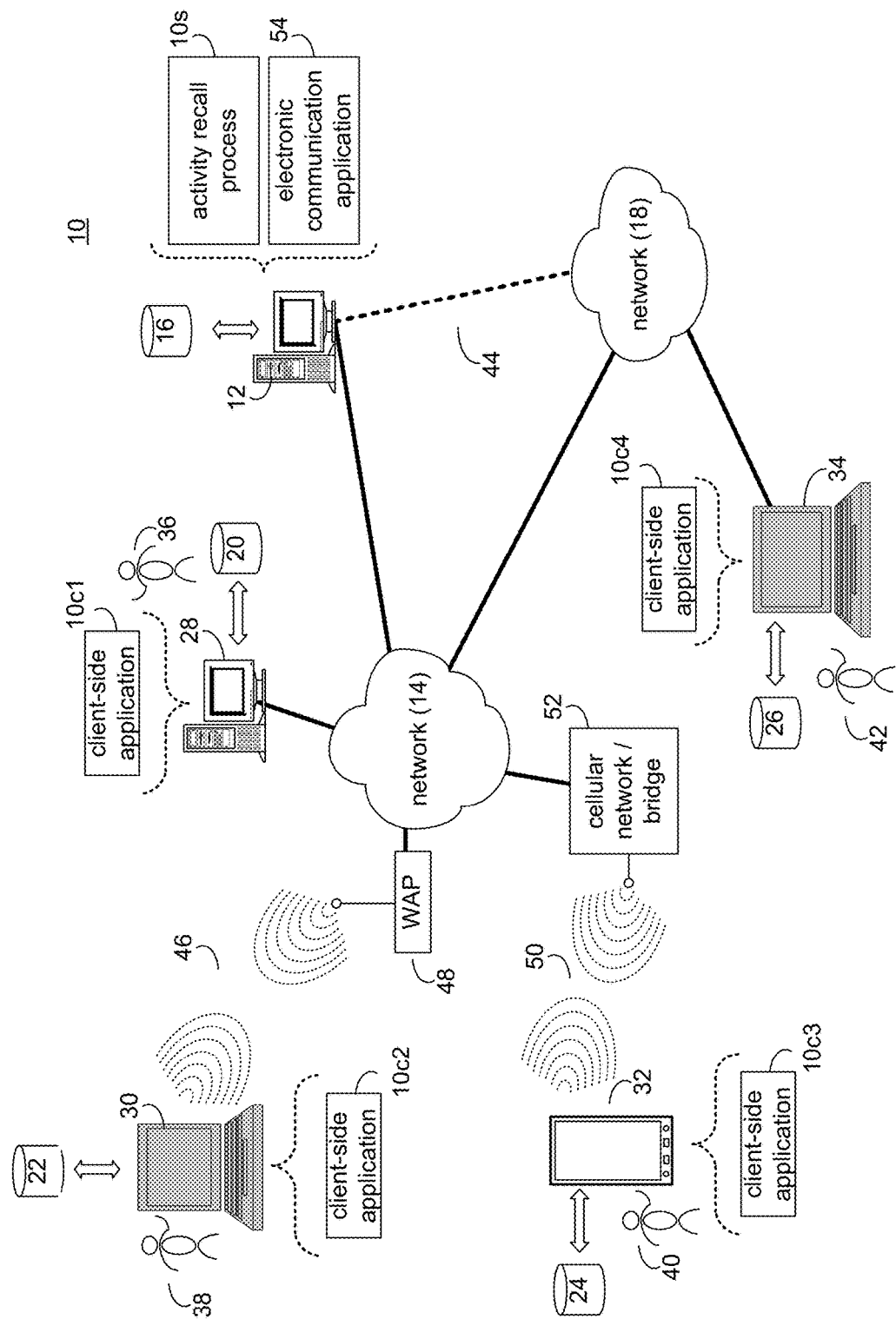
FIG. 1 is a diagrammatic view of a distributed computing network including a computing device that executes a resource sharing process according to an implementation of the present disclosure.

Referring to FIG. 1, there is shown resource sharing process 10. For the following discussion, it is intended to be understood that resource sharing process 10 may be implemented in a variety of ways. For example, resource sharing process 10 may be implemented as a server-side process, a client-side process, or a server-side/client-side process.

For example, resource sharing process 10 may be implemented as a purely server-side process via resource sharing process 10s. Alternatively, resource sharing process 10 may be implemented as a purely client-side process via one or more of client-side application 10c1, client-side application 10c2, client-side application 10c3, and client-side application 10c4. Alternatively still, resource sharing process 10 may be implemented as a server-side/client-side process via server-side resource sharing process 10s in combination with one or more of client-side application 10c1, client-side application 10c2, client-side application 10c3, and client-side application 10c4. In such an example, at least a portion of the functionality of resource sharing process 10 may be performed by resource sharing process 10s and at least a portion of the functionality of resource sharing process 10 may be performed by one or more of client-side application 10c1, 10c2, 10c3, and 10c4.

Accordingly, resource sharing process 10 as used in this disclosure may include any combination of resource sharing process 10s, client-side application 10c1, client-side application 10c2, client-side application 10c3, and client-side application 10c4.

Figure 2:
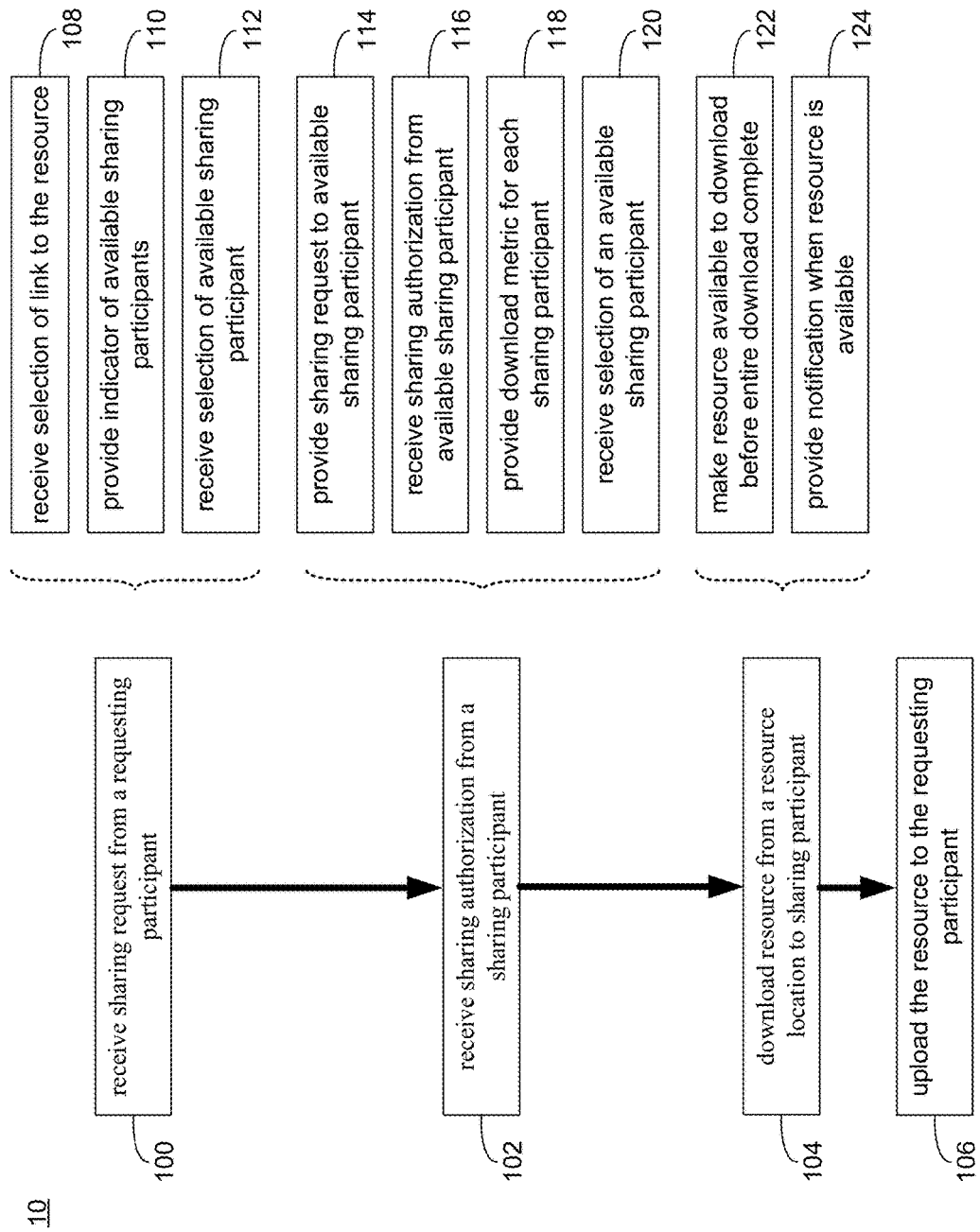
FIG. 2 is a flowchart of the resource sharing process of FIG. 1, according to an implementation of the present disclosure.

Referring also to FIG. 2, and as will be discussed in greater detail below, resource sharing process 10 may receive 100 a sharing request for a resource from a requesting participant of a collaborative session. Resource sharing process 10 may also receive 102 a sharing authorization from a sharing participant of the collaborative session. Resource sharing process 10 may further simultaneously download 104 the resource from a resource location by a computing device associated with the sharing participant and upload 106 the resource to the requesting participant by the computing device associated with the sharing participant.

Resource sharing process 10s may be a server application and may reside on and may be executed by computing device 12, which may be connected to network 14 (e.g., the Internet or a local area network). Examples of computing device 12 may include, but are not limited to: a personal computer, a server computer, a series of server computers, a mini computer, a mainframe computer, or a dedicated network device.

The instruction sets and subroutines of resource sharing process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of client-side applications 10c1, 10c2, 10c3, 10c4 may include but are not limited to, one or more of a media consumption application, a media transport application, a video playback application, a web browser, or a specialized application (e.g., an application running on a mobile platform). The instruction sets and subroutines of client-side application 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, personal computer 28, laptop computer 30, a mobile computing device 32 (such as a smartphone, a table computer, etc.), notebook computer 34, a netbook computer (not shown), a server computer (not shown), a gaming console (not shown), a set-top box, a data-enabled television console (not shown), and a dedicated network device (not shown). Client electronic devices 28, 30, 32, 34 may each execute an operating system.

Users 36, 38, 40, 42 may access quality of service process 10 directly through network 14 or through secondary network 18. Further, quality of service process 10 may be accessed through secondary network 18 via link line 44.

The various client electronic devices (e.g., client electronic devices 28, 30, 32, 34) may be directly or indirectly coupled to network 14 (or network 18). For example, personal computer 28 is shown directly coupled to network 14. Further, laptop computer 30 is shown wirelessly coupled to network 14 via wireless communication channels 46 established between laptop computer 30 and wireless access point (WAP) 48. Similarly, mobile computing device 32 is shown wirelessly coupled to network 14 via wireless communication channel 50 established between mobile computing device 32 and cellular network/bridge 52, which is shown directly coupled to network 14. WAP 48 may be, for example, an IEEE 802.11a, 802.11b, 802.11g, 802.11n, Wi-Fi, and/or Bluetooth device that is capable of establishing wireless communication channel 46 between laptop computer 30 and WAP 48. Additionally, personal computer 34 is shown directly coupled to network 18 via a hardwired network connection.

In some embodiments, resource sharing process 10 may communicate with, interact with, and/or include a component or module of a communication application (e.g., communication application 54). As is generally known, a communication application (e.g., communication application 54) may generally facilitate text, audio and/or video communications between individuals as participants in a communication session. For example, communication application 54 may facilitate instant messaging communications, email communications, voice over IP and/or video over IP communications, electronic meetings, communications via social networking or other collaborative applications or websites, and/or other communication sessions between participants. In some embodiments, a communication session may only include two participants. In some embodiments, a communication session may include more than two participants. In some embodiments, communication application 54 may include, and/or may interact with, for example, an instant messaging application, an email application, a social networking application, an electronic meeting application, a web conferencing application, a voice, or video, over IP application, or a similar application. An example of communication application 54 may include, but is not limited to, IBM® Sametime®. (IBM and Sametime are registered trademarks of International Business Machine Corporation in the United States, other countries, or both).

In an embodiment, the instruction sets and subroutines of communication application 54 may be stored, e.g., on storage device 16 associated with server computer 12, which executes communication application 54, and/or another suitable storage device. Further, users (e.g., one or more of users 36, 38, 40, 42) may access communication application 54 in order to participate in an electronic communication session (such as an instant messaging chat, an email exchange, a voice call, a video call, an electronic meeting, or other communication session type). The users may access communication application 54 via one or more suitable applications, such as client side applications 10c1-10c4 (e.g., which may include an instant messaging application, an email application, a voice-over-IP application, a video-over-IP application, a web browser, a client electronic meeting application, or another application) and/or via a different application (not shown). As generally discussed above, a portion and/or all of the functionality of quality of service process 10 may be provided by one or more of client side applications 10c1-10c4. For example, in some embodiments quality of service process 10 (and/or client-side functionality of quality of service process 10) may be included within and/or interactive with client-side applications 10c1-10c4, which may include client side electronic communication applications, web browsers, or another application. Various additional/alternative configurations may be equally utilized.

As generally discussed above with reference to FIG. 2, Resource sharing process 10 may receive 100 a sharing request for a resource from a requesting participant of a collaborative session. Resource sharing process 10 may also receive 102 a sharing authorization from a sharing participant of the collaborative session. Resource sharing process 10 may further simultaneously download 104 the resource from a resource location by a computing device associated with the sharing participant and upload 106 the resource to the requesting participant by the computing device associated with the sharing participant.

For example, and as generally discussed above, an individual may desire access to a resource (such as a file, a document, a presentation, a media file, etc.) which is located on a system, network, or other location that the individual is currently not capable of access, or for which the individual does not have the necessary privileges to access. Resource sharing process 10 may allow the individual who desires access to the resource to access the resource by way of a collaborative session with another person who does have access to the resource (e.g., by virtue of being able to access the system, network or location on which the resources resides and/or by having the necessary privileges, or the like). Resource sharing process 10 may receive 100 a sharing request for a resource from a requesting participant of a collaborative session. The collaborative session may include, but is not limited to, an instant messaging chat, an electronic meeting, a webinar, a network enabled teleconference or video conference, participation in a shared online space, such as social networking site, or the like. As such, during the course of the collaborative session, resource sharing process 10 may receive 100 a request for a resource from one of the participants of the collaborative session. In some embodiments, an intended purpose of the collaborative session may include the sharing of the resources, in other embodiments, sharing the resources may be ancillary to a primary purpose of the collaborative session.

Figure 3:
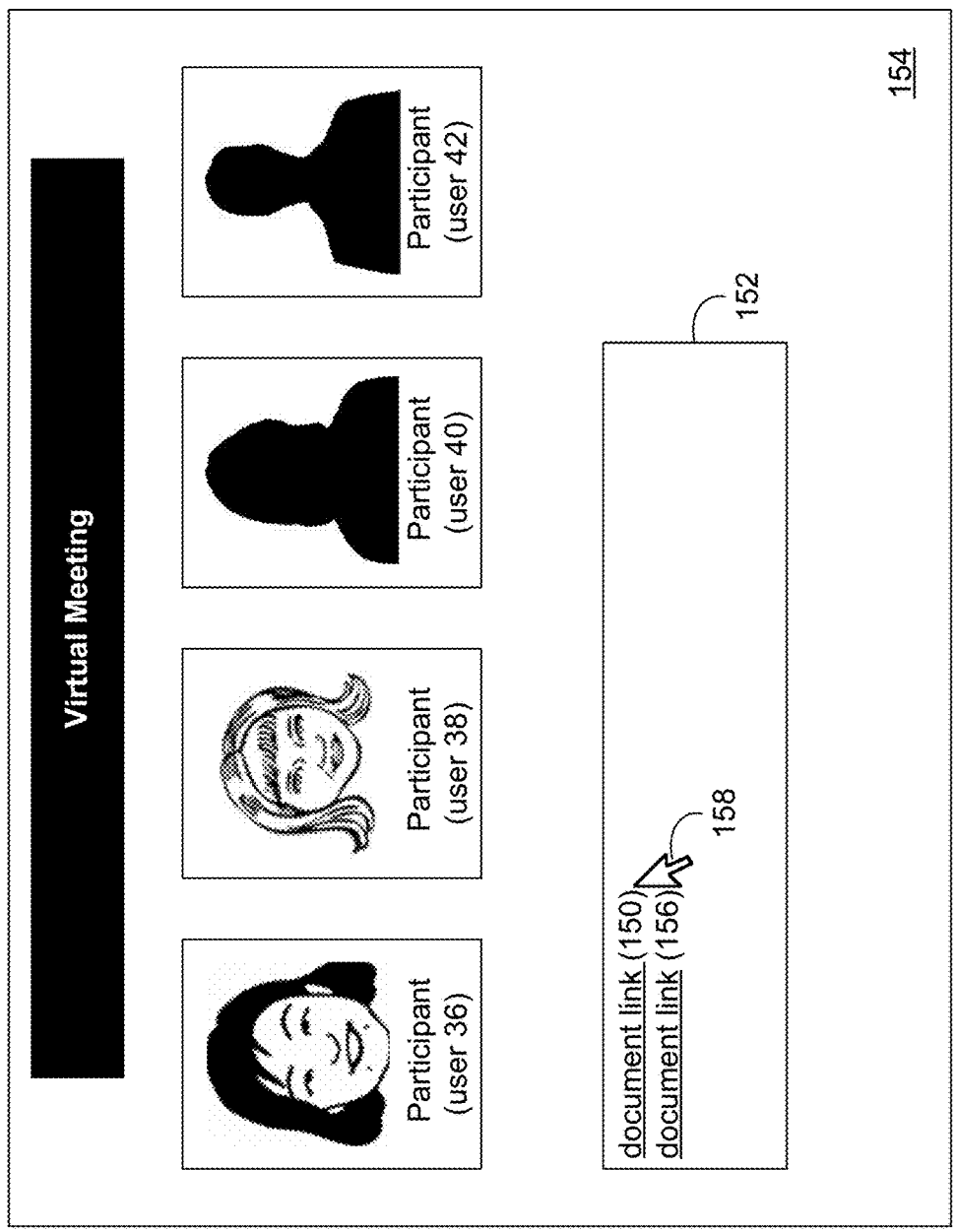
FIG. 3 diagrammatically depicts an implementation of the resource sharing process according to an example embodiment of the present disclosure.

For example, in an illustrative example, user 36, user 38, user 40, and user 42 may participate in an online collaboration session, such as a virtual meeting (e.g., via communication application 54, which may include an electronic meeting application) Each of the participants may take part in the virtual meeting from a different location. For example, user 36 and user 38 may each be working from home. User 40 and user 42 may be located in separate, geographically separated offices. Referring also to FIG. 3, during the course of the virtual meeting user 40 may post a link (e.g., by typing or pasting link 150 into shared text dialog box 152 within meeting interface 154, or otherwise making the link available to one or more of the other participants) to some documents that may be relevant to the topics being discussed during the course of the virtual meeting. In an example situation, the documents may reside within an internal company network. While user 40 and user 42, who may be working from their respective offices, may be able to access the documents on the internal company network, user 36 and user 38 may not be connected to the internal company network, and may not, therefore, be able to access the documents. One or more of user 36 and user 38 may request access to the documents. As a result of the request, sharing process 10 may receive 100 a request for a resource (e.g., the documents indicated by the link posted by user 40) from one of the participants in the collaborative session (e.g., one or more of user 36 and user 38).

Receiving the sharing request may be based upon, at least in part the requesting participant selecting 108 a link to the resource that is not accessible by the requesting participant. For example, one, or both, of user 36 and user 38 may select link 150 posted to the virtual meeting (e.g., via meeting interface 154, which may be provided by communication application 54 and/or one or more of client applications 10c1, 10c2, 10c3, 10c4) by user 40. Resource sharing process 10, alone and/or in conjunction with another application or process (such as communication application 54 and/or an application that may be utilized to attempt to open the selected link or the document addressed by the link) may determine that user 36 and/or user 38 do not have access to the resource indicated by the link. For example, in response to receiving a selection 108 of the link by user 36, sharing process 10 (and/or another process or application) may receive an error, indicating that the link is not accessible by the requesting participant. Continuing with the example in which the link may be for a document located on an internal company network, when resource sharing process 10 receiving an indication of user 36 selecting 108 the link, resource sharing process 10 may also receive an error indicating that user 36 cannot access the document from her current location. In such an example, resource sharing process 10 may receive 100 a sharing request from one or more of user 36 and user 38 based upon, at least in part, selecting 108 link 150 by one or more of user 36 and/or user 38.

In a further illustrative example, receiving 100 the sharing request may be based upon, at least in part, the requesting participant selecting 108 a link to the resource that is not accessible by the requesting participant, for example, by the requesting participant posting the link to the collaboration session and selecting the link as a requested resource. Continuing with the previous illustrative example, in addition to user 40 posting link 150 to one or more documents to virtual meeting interface 154, user 36, who may be working from home, may also post a link (e.g., link 156) to one or more documents, such as a series of presentation slides, which may also reside on the internal company network, and therefore not be accessible to the either user 36 herself, or to user 38, who may similarly not currently have access to the internal company network. Still referring to FIG. 3, resource sharing process 10 may detect user 36 selecting 108 link 156 (e.g., by posting link 156 to virtual meeting interface 154, and selecting link 156), and may receive 100 a sharing request for the document addressed by the link in response to the selection 108 of the link.

Figure 4:
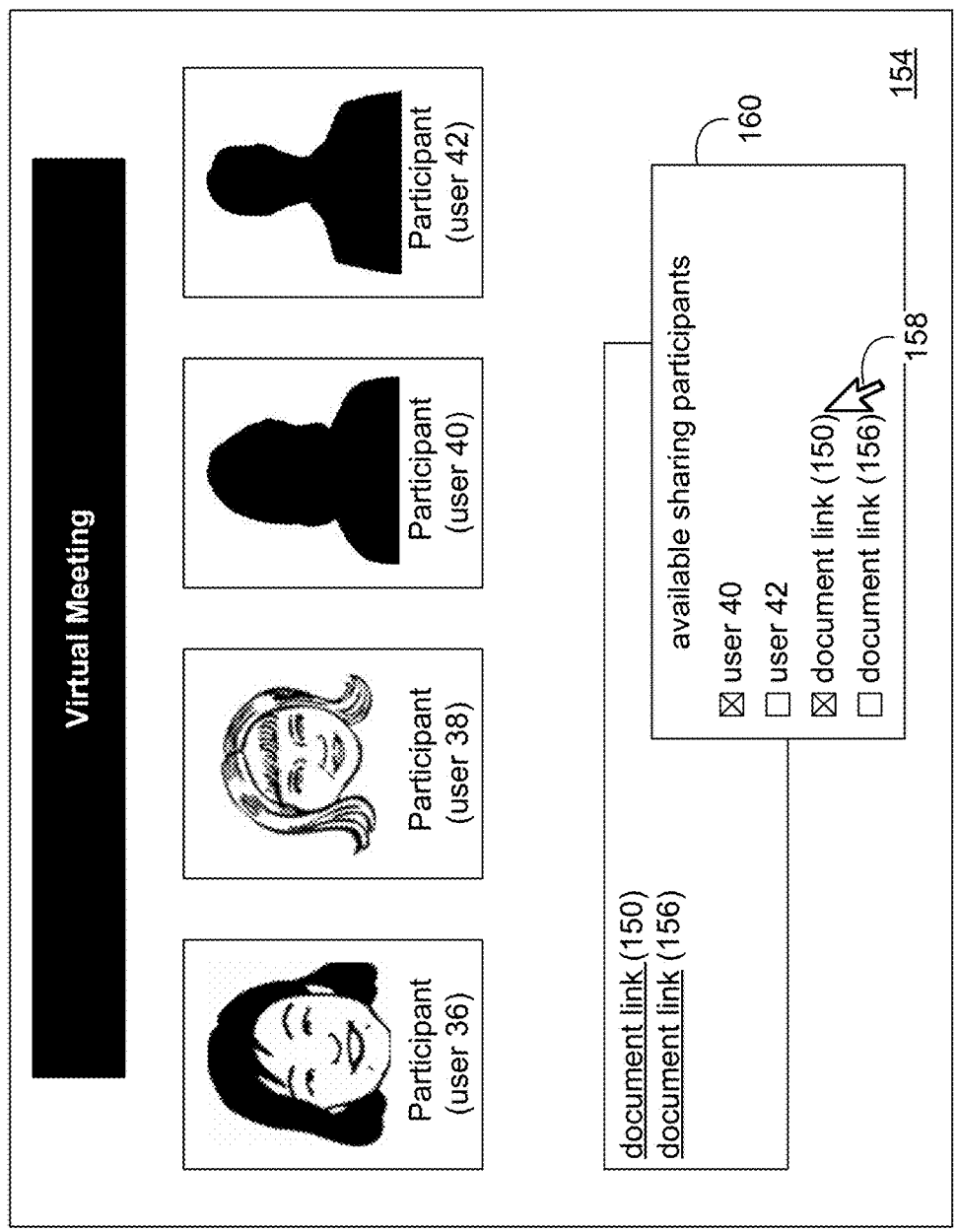
FIG. 4 diagrammatically depicts an implementation of the resource sharing process according to an example embodiment of the present disclosure.

An indicator of available sharing participants for the resource may be provided 110 to the requesting participant. For example, in response to user 36 and/or user 38 requesting a resource that is not available (e.g., by selecting one or more of link 150, 156), resource sharing process 10 may receive 100 a request for the resource (e.g., the documents or presentation slides in the foregoing example), and may identify one or more users why may be capable of providing or facilitating access to the resources by the requesting users. Continuing with the above example, and referring also to FIG. 4, in response to user 36 selecting link 150 (e.g., by clinking on the link with onscreen pointer 158, or otherwise selecting 108 link 150), resource sharing process 10 may provide 110 an indicator (e.g., popup dialog box 160) of available sharing participants. In the illustrative example, user 40 and user 42 may each have access to the requested resources (e.g., the documents indicated by link 150), and may, therefore, each be potential available sharing participants of the communication session (e.g., participants of the virtual meeting). Accordingly, sharing process 10 may include user 40 and 42 as available sharing participants for the resource indicated by link 150 within provided 110 popup dialog box 160. Popup dialog box 160 may be displayed in a user interface of meeting interface 154 for one or more of user 36 and user 38 (e.g., requesting participants).

Receiving 100 the sharing request may include receiving 112 a selection of one or more of the available sharing participants. For example, each requesting participant (e.g., user 36, user 38) may select one, or more than one, of the available sharing participants (e.g., user 40 and user 42 in the illustrative example) from whom the requesting participant would like to receive the requested resource. Continuing with the foregoing example, user 36 may select (e.g., using onscreen pointer 158) desired sharing participant (e.g., user 40) from within popup dialog box 160. Sharing process 10 may receive 112 the selection of user 40 as a sharing participant.

Resource sharing process 10 may also receive 102 a sharing authorization from a sharing participant of the collaborative session. For example, it may not always be desirable to indiscriminately share or allow uncontrolled access to resources. For example, some resources may be confidential or sensitive, or include confidential or sensitive information. As such, it may be desirable to restrict or control access to such resources or information to authorized individuals. Similarly, sharing resources without others may by a draw on network and/or computing capacity. Accordingly, in some embodiments, sharing authorization may be required before resources may be shared with a requesting participant. As such, resource sharing process 10 may receive 102 a sharing authorization for a sharing participant of the collaborative session, e.g., from a selected sharing participant (e.g., user 40 in the above illustrative example).

Figure 5:
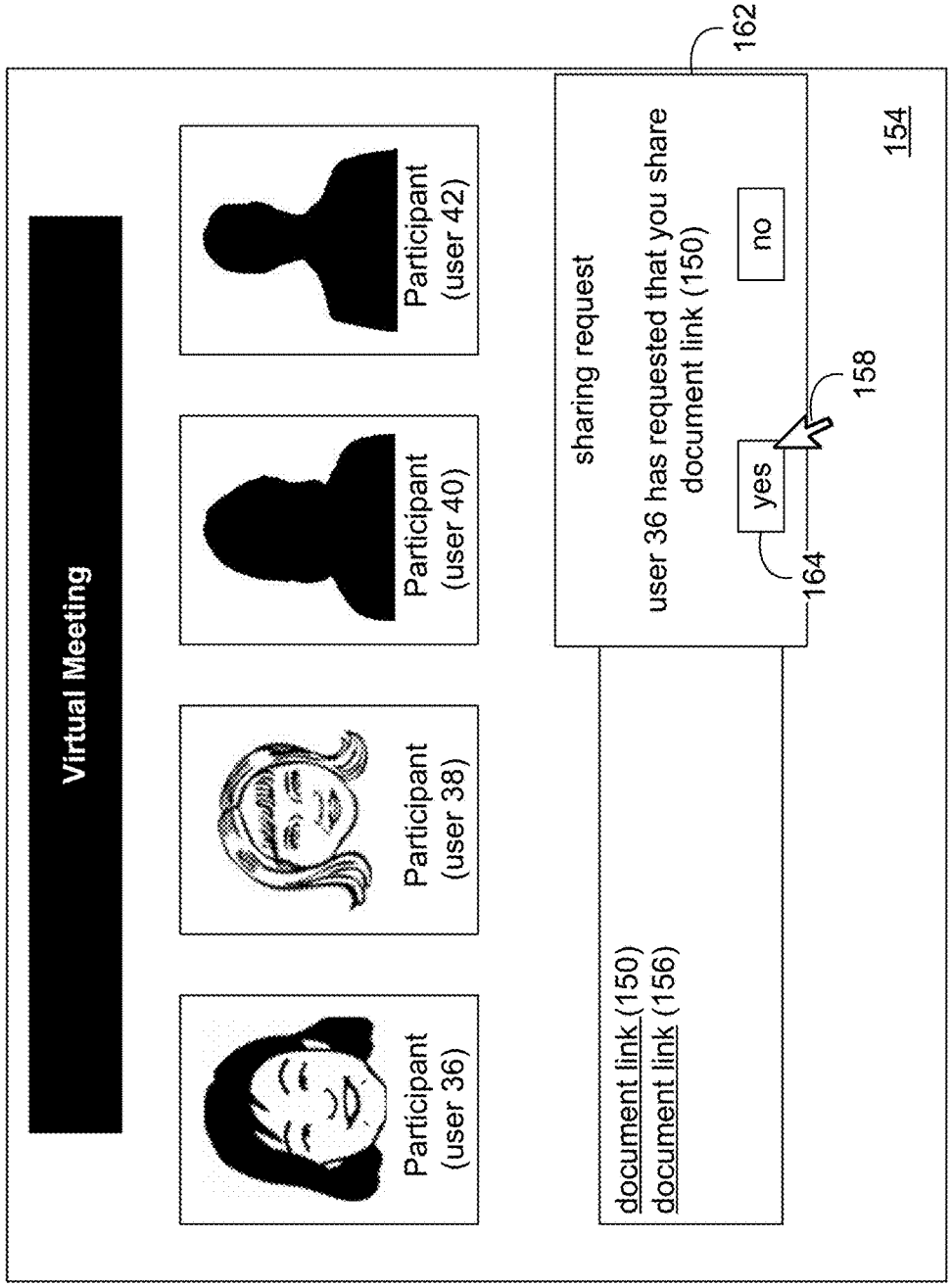
FIG. 5 diagrammatically depicts an implementation of the resource sharing process according to an example embodiment of the present disclosure.

In an embodiment, the sharing authorization may be received 102, at least in part, in response to a request for the resource from the requesting participant that may be provided 114 to available sharing participants of the collaborative session. Continuing with the illustrative example, and referring also to FIG. 5, request 162 may be provided 114 to, e.g., user 40 (e.g., from whom user 36 may have requested the resources associated with link 150). Request 162 provided 114 to user 40 (e.g., via meeting interface 154 displayed on client electronic device 32 utilized by user 40) may include a request that user 40 share the resource (e.g., which may be associated with link 150) with user 36. A similar request may be provided 114 to a sharing participant (e.g., one or both of user 40 and user 42 in the illustrative example) based on a request for a resource from user 38, who may also request access to the resources. Accordingly, a request for the resources may be provided 114 to all, or a subset of potential sharing participants. In some embodiments, e.g., in which the requesting participant has requested the resources from a particular sharing participant, the request may be provided to the particular sharing participant.

Receiving 102 the sharing authorization may include receiving 116 the sharing authorization from one or more of the available sharing participants. For example, in response to receiving the provided 114 request to share the resources with user 36, user 40 may indicate agreement, e.g., by selecting yes button 164. In response to user 40 selecting yes button 164, resource sharing process 10 may receive 116 the sharing authorization from user 40. While not illustrated, in some embodiments access control permissions for the requested resource may be requested from one or more of the requesting participant and the sharing participant. For example, some resources may be confidential or sensitive, and may limit access to only authorized individuals and/or may require a password input or other credentials before access to the resources may be granted. In one such situation user 40, as the sharing participant, may be require to provide access credentials, e.g., via a password, access through an authorized computing device, or other similar access credentials. In some situations, user 36, as the requesting participant, may be required to provide access credentials, e.g., via a password or other access credentials, to confirm that user 36 is permitted to access the resources. In some embodiments, both the sharing participant and the requesting participant may be required to provide access credentials.

A download metric may be provided 118 associated with each available sharing participant. For example, in an embodiment the requested resource may be available from more than one potential sharing participant. However, the capacity for the sharing participants to share the resource may vary. For example, some potential sharing participants may have a higher bandwidth network connection, e.g., which may allow faster transfer speeds for the requested resource (e.g., between the location of the resource and the sharing participant and/or between the sharing participant and the requesting participant). Similarly, some potential sharing participants may be utilizing a computing device having greater capacity for sharing the resources. For example, a more powerful desktop computing device may allow for faster sharing of the resources as compared to, for example, a less capable mobile computing devices. Other network and/or device characteristics may result in varying capacities of the potential sharing participants to facilitate sharing of the resources. Additionally, the capacity of the individual potential sharing participants may differ relative to different requesting participants.

Figure 6:
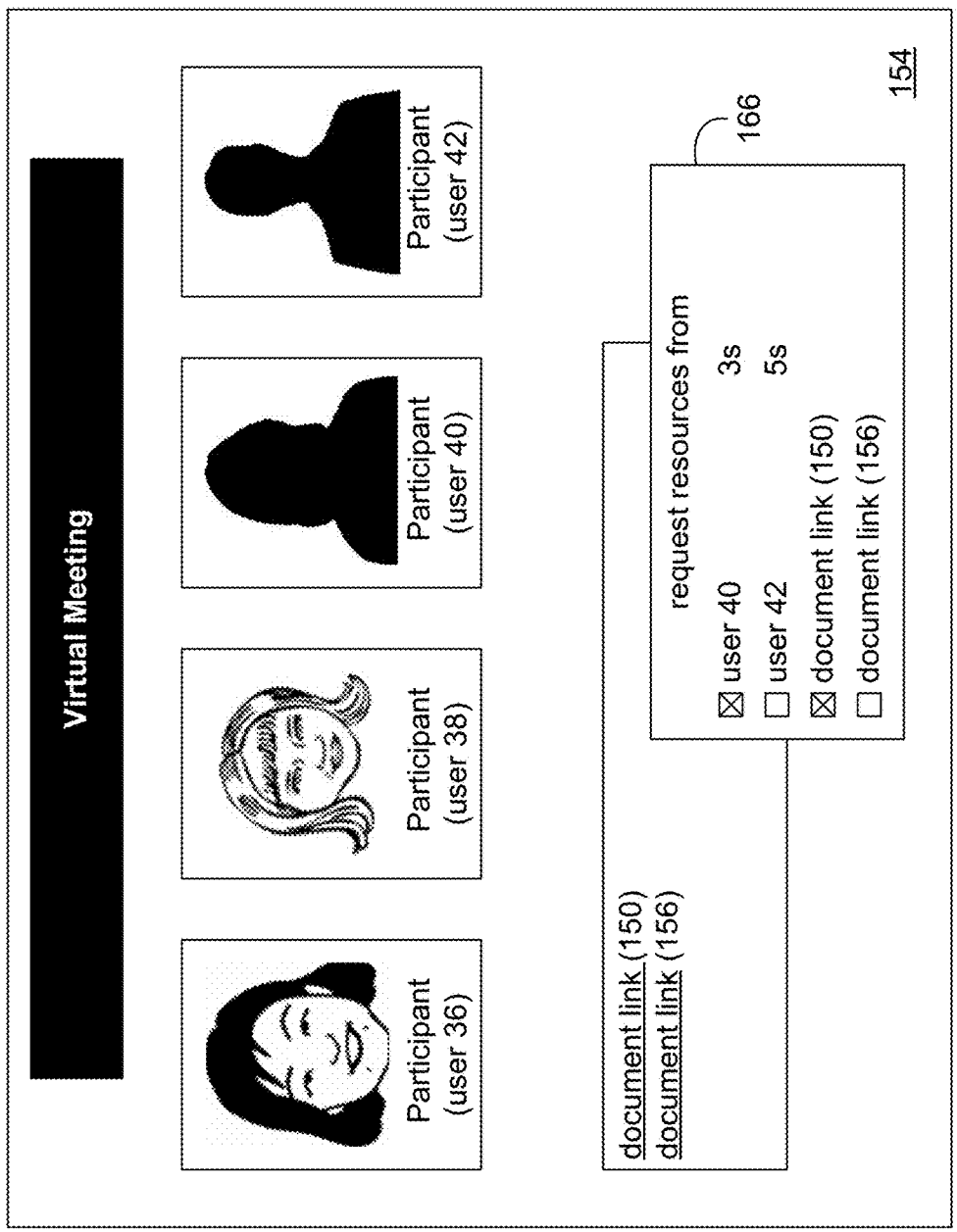
FIG. 6 diagrammatically depicts an implementation of the resource sharing process according to an example embodiment of the present disclosure.

Referring also to FIG. 6, resource sharing process 10 may provide 118 (e.g., via meeting interface 154) a requesting participant (e.g., user 36) with a download metric associated with each sharing participant. For example, as shown in FIG. 6, download metric dialog box 166 may include an indication of each potential sharing participant (e.g., user 40 and user 42) and an associated download metric (e.g., a 3 s download time associated with user 40 and a 5 s download time associated with user 42). It will be appreciated that various additional/alternative download metrics may be utilized other than an estimated download time for the resource. Further, in some embodiments resource sharing process 10 may provide 118 the download metric associated with each potential sharing participant who may have been selected 112 by a requesting user (e.g., in response to the requesting user having been provided 110 with an indication of available sharing participants). For example, if user 36 selected more than one potential sharing users from within dialog box 160, resource sharing process 10 may provide 118 a download metric associated with each selected potential sharing participant. In some embodiments, e.g., as shown in FIG. 6, the requesting participant may be provided 118 with a download metric associated with each available sharing participant as part of being provided 110 with an indication of the available sharing participants. Other configurations may also be implemented.

Resource sharing process 10 may receive 120 a selection of one or more available sharing participants. For example, user 36 may "check" the desired sharing participant, or participants, and may select the "request" option form within dialog 166. In some embodiments, resource sharing process 10 may provide 114 one or more of the selected 112 sharing participants with a request to share the resource with the requesting participant (e.g., user 36 in the illustrative embodiment).

Resource sharing process 10 may further simultaneously download 104 the resource from a resource location by a computing device associated with the sharing participant and upload 106 the resource to the requesting participant by the computing device associated with the sharing participant. It will be appreciated that a description of downloading the resource by the sharing participant, or similar description, may include downloading the resource by a computing device associated with the sharing participant. It will also be appreciated that a description of uploading the resource to the requesting participant, or similar description, may include uploading the resource to a computing device utilized by the requesting participant. For example, in response to receiving a selection 112 of one or more desired sharing participants from the requesting participant (if implemented), and in response receiving 116 a sharing authorization from one or more potential available sharing participants (if implemented), resource sharing process 10 may simultaneously download 104 the resource from the resource location by a computing device associated with the sharing participant, and may upload 106 the resource to the requesting participant by the computing device associated with the sharing participant. In some embodiments, one or more of receiving 112 a selection of a sharing participant and receiving 116 sharing authorization may not be implemented.

Simultaneously downloading 104 the resource from the resource location and uploading 106 the resource to the requesting participant may enable the transfer of the resource being shared to begin before the entire resource has been downloaded by the sharing user. Therefore, resource sharing process 10 may not require the entire resources being shared to first be downloaded by the sharing participant and then, only after the download is complete, allow the resource to be uploaded to the requesting participant. In an embodiment, as soon as the resource begins to be downloaded 104 by the sharing participant, it may begin to be uploaded 106 to the requesting participant. Accordingly, with commensurate transfer speeds between the resource location and the sharing participant and between the sharing participant and the requesting participant, the time required to transfer the resource to the requesting user may only be approximately the time required to download the resource by the sharing participant (e.g., because uploading 106 of the resource to the requesting participant may begin while downloading 104 is still occurring). It will be appreciated the network speeds between the sharing participant and the resource location and between the sharing participant and the requesting participant may effect the total time necessary to transfer the resource to the requesting participant.

The resource may be saved to the computing device utilized by the sharing participant. That is when the resource is downloaded 104 by the sharing participant the resource may be saved to a storage device associated with the computing device utilized by the sharing participant. As such, after the transfer of the resource to the requesting participant is complete, the computing device utilized by the sharing participant may retain a copy of the shared resources. In some embodiments, the resource may not be retained by the computing device associated with the sharing participant. For example, the resource may be buffered as it is being downloaded 104 by the computing utilized by the sharing participant, and the buffer may be cleared as each downloaded 104 portion of the resource is uploaded 106 to the computing device utilized by the requesting participant. In another example implementation, the resource may be saved by the computing device associated with the sharing participant as it is being downloaded 104. Further, once the resource has been completely uploaded 106 to the computing device associated with the requesting participant, the copy of the resource saved to the computing device utilized by the sharing participant may be deleted. Consistent with various implementations in which a copy of the resource may not be retained by the computing device associated with the sharing participant, the sharing participant may act as a pass-through entity for conveying the resource from the resource location to the requesting participant. Other implementations may be utilized.

Consistent with the foregoing, simultaneously downloading 104 the resource by the computing device associated with the sharing participant and uploading 106 the resource to the requesting participant may include making 122 the resource available for download from the computing device associated with the sharing participant by the requesting participant before the entire resource has been downloaded by the computing device associated with the sharing participant. For example, once a portion of the resource has been downloaded 104 by the computing device associated with the sharing participant to enable uploading 104 the resource to the computing device associated with the requesting participant, resource sharing process 10 may make the resource available for download by the computing device associated with the requesting participant (i.e., may make the resource available for upload 106 to the requesting participant). In some implementations, upload 106 to the requesting participant may begin automatically. In some implementations, uploading 106 the resource to the requesting participant may include making 122 the resource available for download by the requesting participant, e.g. once the download 104 of the resource has begun by the computing device utilized by the sharing participant (and/or a sufficient amount of the download 104 has been accomplished to permit uploading 106 of the resource to the requesting participant).

Figure 7:
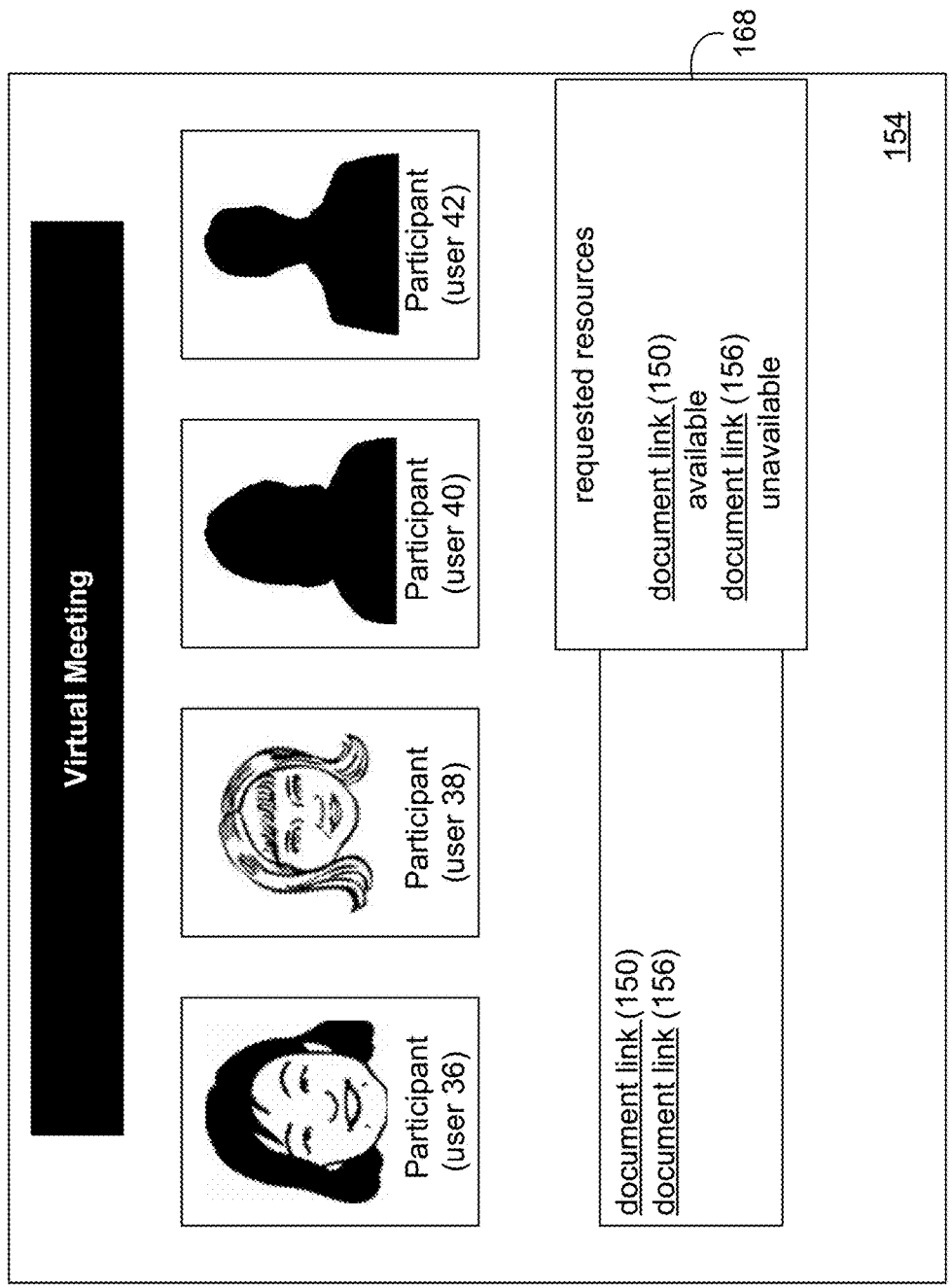
FIG. 7 diagrammatically depicts an implementation of the resource sharing process according to an example embodiment of the present disclosure.

Continuing with the above example, e.g., in which user 36 may have requested resources, e.g., identified by link 150 and link 156, from one or more of user 40 and user 42, and sharing authorization has been received 102 from one or more of user 40 and user 42, resource sharing process 10 may download 104 (and/or facilitate and/or enable downloading) the requested resources by a sharing participant, e.g., by the computing device associated with user 40. Once downloading 104 the requested resources by the computing device associated with user 40 has begun, resource sharing process 10 may make 122 the resources available for download by the computing device associated with user 36, as the requesting participant. Further, and referring also to FIG. 7, as each requested resource becomes available, resource sharing process 10 may provide 124 a notification (e.g., via dialog box 168) to the requesting participant (e.g., user 36) when the resource is available from the computing device associated with the sharing participant. For example, as shown in FIG. 7, the resource associated with link 150 may be available, while the resource associated with link 156 may be unavailable. In some embodiments, user 36 may select link 150 (of the available resource) to begin uploading 106 the resource to the computing device associated with user 36. In some embodiments, once the resource becomes available, resource sharing process 10 may automatically begin uploading the resource to the computing device associated with user 36 (i.e., the requesting participant). In some embodiments, resource sharing process 10 may provide an indicator when uploading of the resource to the computing device associated with the requesting participant is complete, and the resource is, therefore, available to the requesting participant.

In the foregoing illustrative example, resource sharing process 10 may enable access to the resources (such as files, documents, media, etc.) during the course of a collaborative session, such as a virtual meeting, a conference call, chat session, etc. Resource sharing process 10 may similarly enable access to resources by a participant in a collaborative session in a variety of other contexts. For example, in another illustrative example, assume that an individual (e.g., user 36) is at a customer site, and therefore not connected to her internal company network. While at the customer site, user 36 may wish to play a recorded presentation for the customer, however, the recorded presentation may be stored on the internal company network. In such a situation, user 36 may initiate an instant messaging chat session with user 42, who may be in his office, and therefore connected with the internal company network. Resource sharing process 10, which may interact with, or be included as component the instant messaging system, may receive 100 a sharing request from user 38. For example, user 36 may paste a link to the presentation into the chat session with user 42, and ask user 42 to upload the file to her. Resource sharing process 10 may receive 108 the selection of the link by user 36, and in response may receive 100 the sharing request for the presentation.

User 42 may, for example, select the link that user 36 pasted into the chat session, for example, by right clicking on the link. In response to right clicking on the link, user 42 may be presented with one or more options, which may include the option to share the document with user 36. In response to user 42 selecting the option to share the document with user 36, resource sharing process 10 may receive 102 a sharing authorization from user 42, by which user 42, connected to the internal company network, may have authorized the transfer of the file to user 36. Accordingly, resource sharing process 10 may treat the received 100 sharing request and the received 102 sharing authorization as an upload request from user 42 (as the authorizing sharing participant) for the document to be uploaded to user 36. In some embodiments, user 42 may provide credentials, such as a password or the like as part of the sharing authorization.

In response to receiving 102 the sharing authorization, resource sharing process be begin simultaneously downloading 104 the presentation to user 42's computer and uploading 106 the presentation to user 36's computer. For example, as soon as the download 104 to user 42's computer is initiated, resource sharing process 10 may provide 124 an indication to user 36 (e.g., via user 36's computer) that the document is ready for download by user 36. User 36 may click the link to the document, or another indicator that the document is ready for download, to begin uploading 106 the presentation to her computer. In some embodiments, the requested resource may automatically begin uploading to the requesting participant's computer as soon as the resource is available to being uploaded (e.g., once downloading 104 to the sharing participant's computer has initiated).

In an embodiment, resource sharing process 10 may receive data from the download session with the sharing participant (e.g., with the data being downloaded from the resource location), and as the data is being received by the sharing participant from the resource location, resource sharing process 10 may be providing the data for upload to the requesting participant. This may allow the transfer from the sharing participant to the requesting participant without the requesting participant having to wait for the sharing participant to completely download the resource before the requesting participant can receive the resource. In some embodiments, the transfer may be carried out without saving the requested resource by the sharing participant, i.e., without the sharing participant having to locally save the document.

In another illustrative embodiment, assume that an individual, e.g., user 38, has access to system A, but does not have access to system B, but that user 38 wishes to move (e.g., copy) some files from system B to system A. Further, assume that one of user 38's coworkers (e.g., user 42) has access to system B, but does not have access to system A. In such a situation, user 38 may utilize resources sharing process 10 to effectuate and/or facilitate moving the files from system B to system A. User 38 may begin a collaborative session with user 42, such as an instant messaging chat session or other collaborative session. User 38 may send, e.g., via the chat session, user 42 a list of documents he wishes to receive from system B, for example as links to the documents. Resource sharing process 10 may receive 100 a sharing request for the documents in response to user 38 sending the list of documents to user 42. User 42 may, e.g., click on, the links to the documents to provide a sharing authorization, which may be received 102 by resource sharing process 10. Further, user 42 may also add other documents to the list that he is willing to make available to user 38. User 42 may click the documents to be shared, and may if necessary provide access credentials such as a password, which may be received 102 as a sharing authorization by resource sharing process 10.

Resource sharing process 10 may begin downloading 104 the selected documents to user 42, in response to receiving 100 the sharing request and receiving 102 the sharing authorization. Further, resource sharing process 10 may begin uploading 106 the files to user 38. Uploading 106 the files to user 38 may begin automatically, e.g., as soon as download 104 of the documents is initiated by user 42. Additionally/alternatively, uploading 106 the files to user 38 may begin in response to user 38 clicking an availability indicator, or clicking a link to the documents once the files are available for upload. In an embodiment, uploading 106 the files to user 38 in response to user 38 clicking an availability indicator, or a link to the files once they are available for upload, may allow user 38 to choose which files he wishes to receive from user 42 and/or may allow user 38 to choose an order in which he wishes to receive the files from user 42. Continuing with this example, upon receiving the files from user 42, user 38 may save the files to system A. In an embodiment, as part of uploading 106 the files to user 38, user 38 may specify a location to which the files may be saved. In the above example, user 38 may specify a location on system A.

Figure 8:
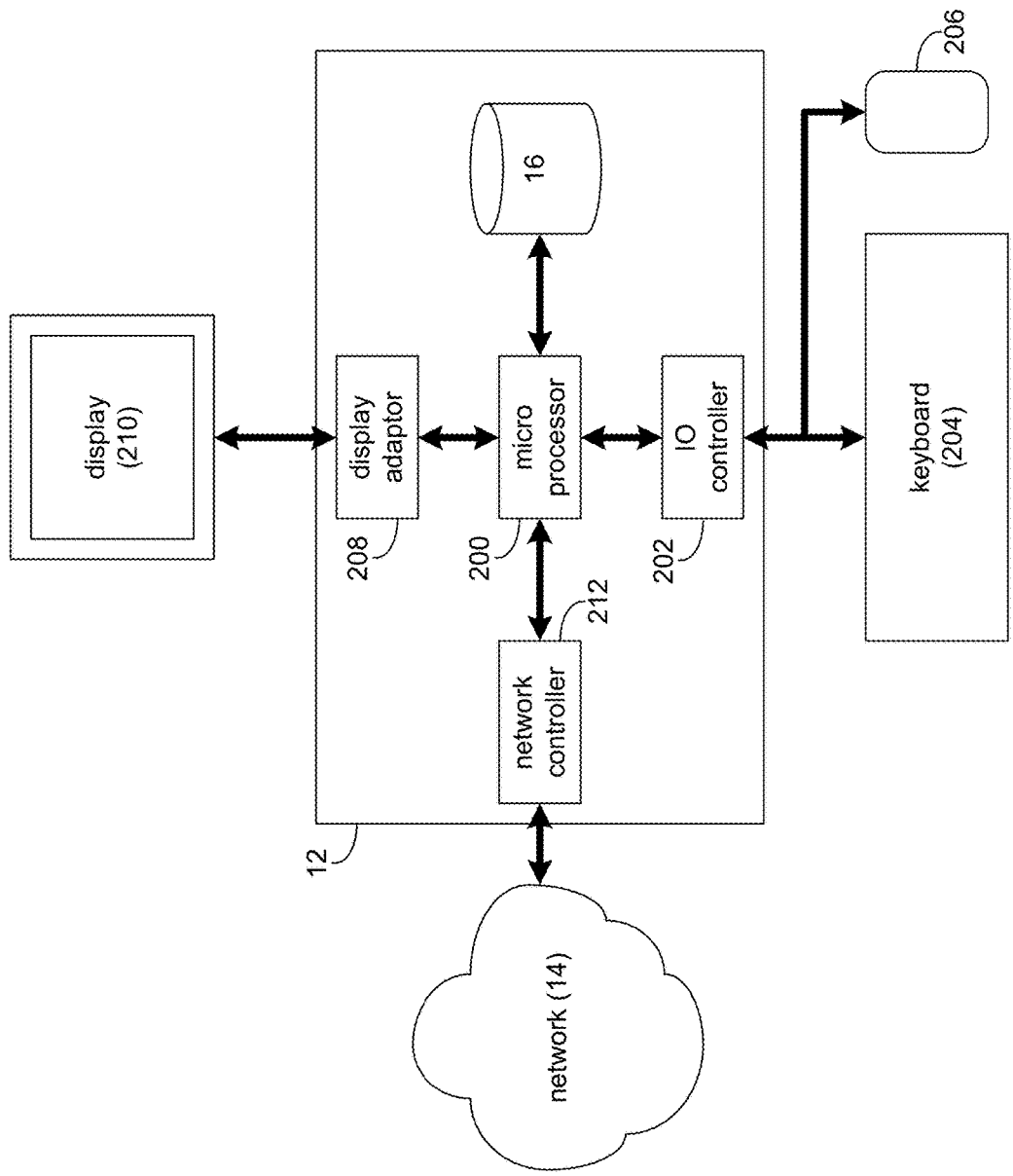
FIG. 8 is a diagrammatic view of the computing device of FIG. 1, according to an implementation of the present disclosure.

Referring also to FIG. 8, there is shown a diagrammatic view of computing system 12. While computing system 12 is shown in this figure, this is for illustrative purposes only and is not intended to be a limitation of this disclosure, as other configuration are possible. For example, any computing device capable of executing, in whole or in part, resource sharing process 10 may be substituted for computing device 12 within FIG. 8, examples of which may include but are not limited to client electronic devices 28, 30, 32, 34.

Computing system 12 may include microprocessor 200 configured to e.g., process data and execute instructions/code for resource sharing process 10. Microprocessor 200 may be coupled to storage device 16. As discussed above, examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices. 10 controller 202 may be configured to couple microprocessor 200 with various devices, such as keyboard 204, mouse 206, USB ports (not shown), and printer ports (not shown). Display adaptor 208 may be configured to couple display 210 (e.g., a CRT or LCD monitor) with microprocessor 200, while network adapter 212 (e.g., an Ethernet adapter) may be configured to couple microprocessor 200 to network 14 (e.g., the Internet or a local area network).

As will be appreciated by one skilled in the art, the present disclosure may be embodied as a method (e.g., executing in whole or in part on computing device 12), a system (e.g., computing device 12), or a computer program product (e.g., encoded within storage device 16). Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium (e.g., storage device 16) having computer-usable program code embodied in the medium.

Any suitable computer usable or computer readable medium (e.g., storage device 16) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, C#.NET, PHP, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor (e.g., processor 200) of a general purpose computer/special purpose computer/other programmable data processing apparatus (e.g., computing device 12), such that the instructions, which execute via the processor (e.g., processor 200) of the computer or other programmable data processing apparatus, create means for implementing the functions/acts specified in the flowchart and/or block diagram block or blocks.

These computer program instructions may also be stored in a computer-readable memory (e.g., storage device 16) that may direct a computer (e.g., computing device 12) or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer (e.g., computing device 12) or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
receiving, by a computing device, a sharing request for a resource, the sharing request sent from a second computing device of a requesting participant of a collaborative session, the resource being at a resource location requesting participant cannot access;
receiving, by the computing device, a sharing authorization from a third computing device of a sharing participant of the collaborative session to act as a pass-through enabling downloading of the resource by the second computing device of the requesting participant via the third computing device of the sharing participant, wherein receiving the sharing request is based upon, at least in part, the second computing device of the requesting participant selecting a link to the resource that is not accessible by the second computing device of the requesting participant, and wherein, in response to selecting the link, a list of available sharing participants is displayed via a user interface provided on the second computing device of the requesting participant; and
simultaneously downloading one or more portions of the resource from the resource location that the requesting participant cannot access to the third computing device of the sharing participant and uploading the one or more portions of the resource from the third computing device of the sharing participant to the second computing device of the requesting participant, wherein uploading the one or more portions of the resource from the third computing device includes clearing the one or more portions of the resource from the third computing device as the one or more portions are uploaded to the second computing device, wherein simultaneously downloading the resource by the computing device associated with the sharing participant and uploading the resource to the requesting participant includes making the resource available for download from the computing device associated with the sharing participant by the requesting participant before the entire resource has been downloaded by the computing device associated with the sharing participant.

2. The computer-implemented method of claim 1, further including:
providing an indicator of available sharing participants for the resource to the requesting participant;
wherein receiving the sharing request includes receiving a selection of one or more of the available sharing participants.

3. The computer-implemented method of claim 1, further including:
providing a request for the resource from the requesting participant to available sharing participants of the collaborative session;
wherein receiving the sharing authorization includes receiving the sharing authorization from one or more of the available sharing participants.

4. The computer-implemented method of claim 3, further including:
providing a download metric associated with each available sharing participant; and
receiving a selection of an available sharing participant from the requesting participant.

5. The computer-implemented method of claim 1, further including providing a notification to the requesting participant when the resource is available from the computing device associated with the sharing participant.

6. A computer program product comprising a non-transitory computer readable storage medium having a plurality of instructions stored thereon, which, when executed by a processor, cause the processor to perform operations including:
receiving, by a computing device, a sharing request for a resource, the sharing request sent from a second computing device of a requesting participant of a collaborative session, the resource being at a resource location that the requesting participant cannot access;
receiving, by the computing device, a sharing authorization from a third computing device of a sharing participant of the collaborative session to act as a pass-through enabling downloading of the resource by the second computing device of the requesting participant via the third computing device of the sharing participant, wherein receiving the sharing request is based upon, at least in part, the second computing device of the requesting participant selecting a link to the resource that is not accessible by the second computing device of the requesting participant, and wherein, in response to selecting the link, a list of available sharing participants is displayed via a user interface provided on the second computing device of the requesting participant; and
simultaneously downloading one or more portions of the resource from the resource location that the requesting participant cannot access to the third computing device of the sharing participant and uploading the one or more portions of the resource from the third computing device of the sharing participant to the second computing device of the requesting participant, wherein uploading the one or more portions of the resource from the third computing device includes clearing the one or more portions of the resource from the third computing device as the one or more portions are uploaded to the second computing device, wherein simultaneously downloading the resource by the computing device associated with the sharing participant and uploading the resource to the requesting participant includes making the resource available for download from the computing device associated with the sharing participant by the requesting participant before the entire resource has been downloaded by the computing device associated with the sharing participant.

7. The computer program product of claim 6, further including instructions for:
providing an indicator of available sharing participants for the resource to the requesting participant;
wherein receiving the sharing request includes receiving a selection of one or more of the available sharing participants.

8. The computer program product of claim 6, further including instructions for:
providing a request for the resource from the requesting participant to available sharing participants of the collaborative session;

wherein receiving the sharing authorization includes receiving the sharing authorization from one or more of the available sharing participants.

9. The computer program product of claim 8, further including instructions for:
providing a download metric associated with each available sharing participant; and
receiving a selection of an available sharing participant from the requesting participant.

10. The computer program product of claim 6, further including instructions for providing a notification to the requesting participant when the resource is available from the computing device associated with the sharing participant.

11. A computing system comprising:
a processor and a memory architecture coupled with the processor, the processor configured for:
receiving, by a computing device, a sharing request for a resource, the sharing request sent from a second computing device of a requesting participant of a collaborative session, the resource being at a resource location that the requesting participant cannot access;
receiving, by the computing device, a sharing authorization from a third computing device of a sharing participant of the collaborative session to act as a pass-through enabling downloading of the resource by the second computing device of the requesting participant via the third computing device of the sharing participant, wherein receiving the sharing request is based upon, at least in part, the second computing device of the requesting participant selecting a link to the resource that is not accessible by the second computing device of the requesting participant, and wherein, in response to selecting the link, a list of available sharing participants is displayed via a user interface provided on the second computing device of the requesting participant; and
simultaneously downloading one or more portions of the resource from the resource location that the requesting participant cannot access to the third computing device of the sharing participant and uploading the one or more portions of the resource from the third computing device of the sharing participant to the second computing device of the requesting participant, wherein uploading the one or more portions of the resource from the third computing device includes clearing the one or more portions of the resource from the third computing device as the one or more portions are uploaded to the second computing device, wherein simultaneously downloading the resource by the computing device associated with the sharing participant and uploading the resource to the requesting participant includes making the resource available for download from the computing device associated with the sharing participant by the requesting participant before the entire resource has been downloaded by the computing device associated with the sharing participant.

12. The computing system of claim 11, wherein the processor is further configured for:
providing an indicator of available sharing participants for the resource to the requesting participant;
wherein receiving the sharing request includes receiving a selection of one or more of the available sharing participants.

13. The computing system of claim 11, wherein the processor is further configured for:
providing a request for the resource from the requesting participant to available sharing participants of the collaborative session;
wherein receiving the sharing authorization includes receiving the sharing authorization from one or more of the available sharing participants.

14. The computing system of claim 13, wherein the processor is further configured for:
providing a download metric associated with each available sharing participant; and
receiving a selection of an available sharing participant from the requesting participant.

* * * * *